US012649691B2

(12) United States Patent　　　(10) Patent No.: US 12,649,691 B2
Türei et al.　　　　　　　　　　　　(45) Date of Patent: Jun. 9, 2026

(54) ADMIXTURE COMPOSITION FOR THE PRODUCTION OF LIGHTWEIGHT CONCRETE CONTAINING POLYSTYRENE BEADS, PROCESS FOR THE PREPARATION OF THE COMPOSITION AND ITS APPLICATION

(71) Applicant: "ICL" INNOVATION CONCRETE LABORATORY KORLÁTOIT FELELSSÉGÜ TÁRASASÁG, Kecskemét (HU)

(72) Inventors: Árpád Türei, Kecskemét (HU); László Csordás, Felsölajos (HU); Ferenc Sipos, Szentes (HU); Sándor Tarján, Szegvár (HU)

(73) Assignee: "ICL" INNOVATION CONCRETE LABORATORY KORLÁTOIT FELELSSÉGÜ TÁRASASÁG, Kecskemét (HU)

( * ) Notice: Subject to any disclaimer, the term of this patent is extended or adjusted under 35 U.S.C. 154(b) by 853 days.

(21) Appl. No.: 17/771,295

(22) PCT Filed: Oct. 21, 2020

(86) PCT No.: PCT/HU2020/000032
§ 371 (c)(1),
(2) Date: Apr. 22, 2022

(87) PCT Pub. No.: WO2021/079162
PCT Pub. Date: Apr. 29, 2021

(65) Prior Publication Data
US 2022/0371959 A1　　Nov. 24, 2022

(30) Foreign Application Priority Data
Oct. 22, 2019　(HU) ................................... P1900365
Sep. 22, 2020　(HU) ................................... P2000312

(51) Int. Cl.
| | |
|---|---|
| *C04B 26/16* | (2006.01) |
| *C04B 14/04* | (2006.01) |
| *C04B 14/24* | (2006.01) |
| *C04B 16/04* | (2006.01) |
| *C04B 18/02* | (2006.01) |
| *C04B 24/26* | (2006.01) |
| *C04B 24/42* | (2006.01) |

(52) U.S. Cl.
CPC ............ *C04B 26/16* (2013.01); *C04B 14/045* (2013.01); *C04B 14/24* (2013.01); *C04B 16/04* (2013.01); *C04B 18/027* (2013.01); *C04B 24/2623* (2013.01); *C04B 24/42* (2013.01)

(58) Field of Classification Search
CPC ....... C04B 26/16; C04B 14/045; C04B 14/24; C04B 18/02; C04B 24/2623; C04B 24/42; C04B 2103/0046; C04B 2111/40; C04B 20/1085; C04B 40/0039; C04B 18/021

USPC .............................................................. 524/4
See application file for complete search history.

(56) References Cited

U.S. PATENT DOCUMENTS

| | | |
|---|---|---|
| 4,137,198 A | 1/1979 | Sachs |
| 4,371,639 A | 2/1983 | Muszynski |
| 4,612,748 A | 9/1986 | Arnold et al. |
| 4,689,358 A | 8/1987 | Schorr et al. |
| 7,632,348 B2 | 12/2009 | Cowan et al. |
| 9,051,447 B1 | 6/2015 | Figovsky et al. |
| 2003/0090016 A1 | 5/2003 | Petrovic et al. |
| 2006/0201090 A1* | 9/2006 | Guevara ................. C04B 16/08 52/309.12 |
| 2007/0062415 A1 | 3/2007 | Guevara et al. |

(Continued)

FOREIGN PATENT DOCUMENTS

| | | |
|---|---|---|
| CN | 107954649 A | 4/2018 |
| WO | 2009/152617 A1 | 12/2009 |

OTHER PUBLICATIONS

Authorized Officer: Roesky, Rainer, International Search Report and Written Opinion issued in PCT application No. PCT/HU2020/000032, Jan. 28, 2021, 11 pp.

*Primary Examiner* — Hannah J Pak

(74) *Attorney, Agent, or Firm* — Millen, White, Zelano & Branigan P.C.; Ryan R. Pool

(57) ABSTRACT

The present invention relates to an admixture composition for the production of lightweight concretes containing polystyrene beads, which comprises a mixture of organic and inorganic substances which consists of the reaction products of polyurethane resin, tetraethyl orthosilicate, a glycol compound, an aromatic vinyl compound containing an unsaturated double bond, preferably styrene, and an inorganic silicate compound and preferably comprises the following components: glycol copolymer type compounds, in an amount of 15-10 w/w %, glycol polymer-silica type compounds, in an amount of 45-50 w/w %, polyurethane-b as ed resin, in an amount of 13-22 w/w % polystyrene in an amount of 2-3% w/w %, and foam glass beads in an amount of 25-15 w/w %, and a) for the production of a liquid product, based on the total mass of the above composition, organic solvents in an amount of 15-20 w/w %, and water in an amount of 10-5 w/w %; or b) for the production of a solid preparation, based on the total mass of the above composition, polyvinyl acetate or polyvinyl alcohol in an amount of 10-5 w/w %; aluminium hydroxide in an amount of 2-5 w/w %, and calcined limestone powder in an amount of 8-10 w/w %. The invention also relates to the production and use of the above admixture composition.

1 Claim, No Drawings

(56) References Cited

U.S. PATENT DOCUMENTS

2008/0118740 A1* 5/2008 Kuwahara ............... B32B 27/06
                                                            428/354
2021/0039997 A1* 2/2021 Salami ..................... C04B 7/44

* cited by examiner

ADMIXTURE COMPOSITION FOR THE PRODUCTION OF LIGHTWEIGHT CONCRETE CONTAINING POLYSTYRENE BEADS, PROCESS FOR THE PREPARATION OF THE COMPOSITION AND ITS APPLICATION

The present invention relates to an admixture composition for the production of lightweight concrete containing polystyrene beads with improved concrete technological properties, furthermore to a process for the production of the composition and to the use of the admixture composition.

It is known that one of the most significant types of concrete, based on the field of construction, is lightweight concrete containing a certain amount of polystyrene (EPS) beads with thermal insulation and load-bearing properties, produced by admixture. Various lightweight concretes are increasingly used in the manufacture of floors and slabs, as well as space-filling materials. In many cases, however, masonry elements and structural elements have already been made from this type of concrete.

Polystyrene lightweight concrete is a type of concrete that contains polystyrene beads, water, sand and cement, and lightweight aggregates. The simplest representative of this type of concrete is no-fines concrete. No-fines concrete is primarily used as a thermal insulation system and as an additional construction technology. The main features of these systems are low body density (200-400 kg/m$^3$) and relatively low flexural and compressive strength, but their thermal insulation capacity is excellent.

The most commonly used form of lightweight concretes with a body density of 400-1000 kg/m$^3$ is aerated lightweight concrete (gas concrete). This type of concrete is mainly used as a masonry element and an infill material, during the production of which a gas or foam forming material is mixed into the concrete, as a result of which the porous structure is formed.

Masonry and structural elements are made of lightweight concretes having a high bulk density and compressive strength, which are characterized by high cement content and body density, but they are also used in the production of layered products; the essence of that technology is that lightweight concrete is embedded around a central steel structure functioning as an inner core—manufactured by edge bending or cold moulding.

Aggregate polystyrene lightweight concretes have a wide range of applications due to their advantageous properties in practice, which is why a number of processes have been developed for their manufacture in recent decades. Aggregate polystyrene lightweight concretes can be classified into three main types based on their composition and production technology.

In the first case, via a physical method the surface of the polystyrene beads is coated with a compound suitable for this, thereby enabling the beads to adhere to the cement stone truss by a chemical interaction between the compounds on their surface and the particles of the hydraulic binder. These concretes generally have low polystyrene content (5-30%) and medium admixture content, with a compressive strength of around 5-20 MPa.

The second type includes systems in which the surface of the polystyrene beads is treated with a suitable polymer compound(s) which, entering into reaction with the materials formed during the hydration of the cement particles (gel formation), the individual aggregates and the mixing water, result in forming composite structures. These types of concrete are characterized by both high polymer compound content (3-20%) and admixture content (30-60%) and they result in a product having high compressive strength (10-40 MPa).

The third group includes processes that combine the surface treatment of polystyrene beads with polymers and the ability of the polymers in question to form crosslinked structures using adequate compounds. In this case, various known admixtures can be omitted, but even the hydraulic binder can be omitted from the system (synthetic resin-polystyrene systems: polymer concrete). They are characterized by medium compressive strength and extremely high abrasion resistance.

The solutions described above are illustrated in the patent literature, for example, by the references cited below.

The description of the disclosed U.S. Pat. No. 4,137,198A describes a process for the production of a building material (aerosol and aerogel) which can be obtained using an organic polymer and an inorganic agent, in which the particles of a hydraulic binder (cement, gypsum) have been dispersed without adding sand. During manufacture, air is blown into the aqueous emulsion of the synthetic resin-polymer-copolymer (polyurethane; polyvinyl compounds) (foaming) and then the inorganic agent is admixed in a specified ratio. The cement content of polymer products thus obtained varies between 0-25% and their average compressive strength is between 2.75 and 13.82 MPa.

The description of the disclosed International Patent No. WO2009/152617 describes a process for coating the surface of EPS beads using polyvinyl acetate and polyvinyl alcohol and for the production of concretes manufactured with these materials using hydraulic binder, water, sand, superplastizing admixtures and polypropylene fiber reinforcement. The average polystyrene bead content of the concretes manufactured in this way is between 20-40%. The description does not provide concrete technology characteristics to clearly define the properties of the product.

The description of the disclosed U.S. Pat. No. 4,612,748A describes a process for the production of a monolithic building block with a reinforcing cage in a given layout, which can be manufactured from concrete made of hydraulic binder, water, sand, polyester synthetic resin and a catalyst.

The description of U.S. Pat. No. 9,051,447B1 is intended for polymer concretes manufactured by using a combination of different monomers (acrylate/methacrylate) and soybean and other vegetable oils with a functional group and their use. They are characterized by the absence of hydraulic binder(s) Class I, but the aggregate content of such concretes is high. The average composition of the polymers used here is approx. 60 w/w % of a multifunctional acrylate/methacrylate vegetable oil, not more than 10 w/w % of a multifunctional acrylate/methacrylate monomer, and approx. 40 w/w % of a multifunctional acrylate/methacrylate oligomer. Primarily, ground dolomite and sand are used as aggregates. The average composition of these concretes can be given as follows: 8.7-9.6 w/w % of polymer; 0.1-0.4 w/w % of initiator; 0.03-0.2 w/w % accelerator; 89.2-91.2 w/w % of aggregate (average composition of the aggregate: 43.3-86.2 w/w % of dolomite; 43.3 w/w % of sand and 3.2-3.9 w/w % of coal fly ash).

The disclosed Patent No. US20030090016A1 describes the use of polyurethanes formed by the reaction of vegetable oil-based polyols and isocyanates for the production of concretes with a high content of admixtures. The process is based on reacting plant polyols with stoichiometric amount of isocyanates and mixing the polyurethane compounds thus obtained with a bulking agent (silica, aluminium-oxide, talc, coal fly ash, limestone flour, crushed minerals, etc.) in an amount of 10-200 volume percent. According to the findings of the patent, the hydroxyl number of the polyols is directly related to the technological characteristics of the products formed, and the amount of polymer matrix used varies according to a plateau value in terms of technological characteristics. After the addition of a given amount of polymer, the technological characteristics change in an unfavorable direction.

The description of the disclosed U.S. Pat. No. 4,689,358A presents a process for the production of polymeric concretes with a high epoxy synthetic resin content (21-23 volume percent) without the use of hydraulic binder(s) Class I, the main characteristics of which are high frost resistance and watertightness. The average composition of the products described here is as follows: controlled particle size (50-100 μm) aluminosilicate (30-36 volume percent), surface-treated perlite clay mineral (28-32% by volume), aluminium oxide trihydrate (14-15 volume percent) and epoxy synthetic resin (21-23 volume percent).

The description of the disclosed U.S. Pat. No. 4,371,639A presents a process for the production of polymer concretes using polyester-type synthetic resin polymers (14-17 w/w %) and coal fly ash and various types of sand by radical polymerization technology. The main characteristics of the concretes produced in this way are the high compressive and flexural strength (40-60 MPa and 18-26 MPa).

The description of the disclosed Patent No. US20070062415A1 presents ready-mixed polystyrene lightweight concrete using re-foamed, cellular PS particles with a size of 0.2-8 mm and slag cement type CEM III so that the resulting product contains 8-20 volume percent of cement, 11-50 volume percent of sand, 10-31 volume percent of re-foamed PS particles, 9-40 volume percent of heavyweight aggregates (ground slate) and 10-22 volume percent of water. The finished concrete mixture has a minimum compressive strength of 9.65 MPa.

The description of the disclosed U.S. Pat. No. 7,632, 348B2 presents a process for the manufacture of concrete elements, structural elements that can be made using polymer-cement composite and re-foamed PS particles with a size of 0.2-8 mm. The lightweight concrete containing the cement composition applied in 10 to 90 volume % and the PS particles in 10 to 90 volume % has a compressive strength of at least 11.7 MPa.

All the solutions described in the above-referenced patents and the processes included therein result in products with good concrete technology properties, but do not provide a satisfactory solution for the production of lightweight concrete containing polystyrol beads with improved physical properties, which can be used for a wide range of applications. Furthermore, the known solutions referred to are also unsatisfactory in terms of historical and production costs, production technology conditions, applicability and environmental awareness aspects.

Therefore, the object of the present invention is to provide admixture compositions that can be produced in different states of matter, but operate on a similar principle of considering their mechanism of action and a process for their preparation, and to use admixture compositions for the production of lightweight concrete having improved concrete technology, characteristics—being load-bearing, reinforceable, modifiable—with improved sound technology properties, thermal insulation capacity and which is made suitable for the production of masonry and structural elements by its concrete technological characteristics.

According to the invention, it has been found that our objects are achieved essentially by a large increase in the content of lightweight concrete polystyrene beads. According to the invention, the polystyrene beads are incorporated into the cement truss by chemical reactions using the admixture composition prepared by the process according to the invention, having the composition according to the invention so that active ingredients suitable for this are incorporated into the surface of the polystyrene beads by surface chemical methods. By using the admixture compositions according to the invention, the desired beneficial effects can be achieved during the mixing/production of the lightweight concretes.

The compositions and methods currently known from the prior art do not yield a technical solution suitable for achieving the above objectives.

It has been found that in order to chemically incorporate large amounts of polystyrene beads into lightweight concrete, an admixture composition is required which is capable of altering the physiorption or chemisorption surface properties of the polystyrene beads used to the desired extent.

To achieve this, pursuant to the recognition according to the invention a colloidal admixture composition have been developed which comprises a glycol copolymer/polymer silica/glycol silicate system (hereinafter referred to as polymer silica) dispersed in a synthetic resin support material, which can be used to modify and influence certain characteristics of the lightweight aggregate concrete shown during application, by using the admixture composition, it is also possible to use special plastic fiber chips mixtures as fiber reinforcing material, which fact is not negligible from an environmental point of view either.

The admixture composition according to the invention provides the implementation of the following condition system:

chemical modification of the surface of the polystyrene beads used in a way that the admixture composition used in the process allows the incorporation of copolymer-polymer-silica-silicate complex groups into the surface of polystyrene beads of different size distribution;

formation of polystyrene beads surface-modified by reactive polymer-silica groups (the general formula of which is: $-OSiO(OH)_n$) and copolymer/polystyrene, copolymer/polymer-silica/polystyrene and polymer-silica/polystyrene particles of variable composition which can be controlled by reaction parameters;

it allows the formation of a silicate chemical interaction between the polystyrene particles which surface was modified by reactive groups, the reactive groups-containing polystyrene compounds formed during the process, and the compounds formed during the hydration of certain cementitious constituents, whereby the surface-modified polystyrene beads and the surface-modified polystyrene particles formed in the chemical reaction can become structure organising;

allows the use of large quantities of plastic chips, in a manner analogous to the surface chemical reactions given above, which is advantageous both from an environmental technological point of view and for the purpose of improving certain concrete technology characteristics of the products (e.g. improving flexural tensile strength); and allows the kinetic control of cement hydration processes by differentiating the reactions between the surface-modified polystyrene beads and the surface-modified polystyrene particles and the different calcium silicates being formed in the cement hydration processes, as well as reducing the amount of silicate chemical reactions that are less favorable from the point of view of concrete technology and the probability of their occurrence.

The present invention therefore relates, in one aspect, to an admixture composition for the production of lightweight concretes containing polystyrene beads, which is a mixture of organic and inorganic materials which consists of a reaction products of polyurethane resin, tetraethyl orthosilicate, some glycol compound, an aromatic vinyl compound containing unsaturated double bonds (preferably styrene; the component is hereinafter generally referred to as styrene for simplicity) and an inorganic silicate compound, and preferably contains the following components:

glycol copolymer type compounds, 15-10 w/w %,
  glycol polymer silica type compounds, 45-50 w/w %,
  polyurethane-based synthetic resin, 13-22 w/w %,
  polystyrene, 2-3 w/w %
  foam glass beads in an amount of 25-15 w/w %, and
  a) to produce a liquid product based on the total weight of the above composition organic solvents 15-20 w/w %, and
  water in an amount of 10-5 w/w %; or
  b) to prepare a solid composition based on the total weight of the above composition polyvinyl acetate or polyvinyl alcohol 10-5 w/w %, and
  aluminium hydroxide 2-5 w/w %, and
  calcined limestone flour in an amount of 8-10 w/w %.

The admixture composition according to the invention is thus a complex colloidal system, which is formed in the reaction of an organic polystyrene solution or a polystyrene/polymer mixture (2), an organic silane ester compound (3), a glycol compound (4), a polyglycol compound (5) and an inorganic silicate compound (6) dispersed in synthetic resin or synthetic resin mixture (1) as a dispersion medium, on the surface of an agent (7) having a high specific surface, using a catalyst (8). The admixture composition according to the invention can also be prepared as a liquid suspension by diluting with a solvent mixture (9A) of a given composition, and by adding other solid admixtures (9B) in the form of solid granules, according to the use and transport etc. requirements.

The constituent parent compounds referred to in the preceding paragraphs may preferably, but are not limited to, the following:

(1) polyurethane synthetic resin or polyurethane/polyisocyanate synthetic resin mixture (hereinafter: PU)
  (2) polystyrene solution (hereinafter: PS stock solution) or a mixture of polystyrene solution and polyvinyl alcohol (hereinafter: PS/PVA polymer blend) or polystyrene solution and polyvinyl acetate (hereinafter: PS/PVAc polymer blend)
  (3) tetraethyl orthosilicate (hereinafter: TEOS)
  (4) 1,2-propylene glycol (hereinafter: 1,2-PG)
  (5) polypropylene glycol (hereinafter: PPG P400)
  (6) 40% solution of sodium silicate (hereinafter: liquid glass solution)
  (7) 0.63 mm diameter foam glass bead
  (8) a mixture of anhydrous $Al(OH)_3$ and $AlCl_3$ in a weight ratio of 10:1 and 100:1, respectively (hereinafter: $AlCl_3$)
  (9A) 60/40 mixture of dichloromethane (DCM) and acetone
  (9B) Metakaolin, coal fly ash and microsilica.

The glycol compound is generally preferably an alkyl glycol and the aromatic vinyl compound containing an unsaturated double bond is styrene.

The theoretical background and basis of the process for preparing the admixture composition according to the invention is to coat a material having a specific surface and surface charge, in this case a foam glass bead, as a substrate with a polystyrene/polymer complex containing reactive copolymer/polymer silica groups. and to disperse the material is in a resin matrix. The unit processes of the process are based on the known hydrolysis of the organic and inorganic silicon compounds used, namely that the reaction of the silicon compounds used with basic compounds and their acidic hydrolysis can lead to the formation of different reaction products depending on pH and temperature. A common feature of the organic and inorganic silicon compound is that, with the use of a large excess of water, the end product of the reactions at room temperature is silicon dioxide.

The hydrolysis process of an organic silicon compound using a weak or medium-strong organic base can generally be described by the following equations:

$$SiR_x + nOH^- \leftrightarrow Si(R)_{x-n}(OH)_n + nR\text{-}O^{31}$$

Under anhydrous conditions, the equilibrium reaction can practically be completely shifted towards the formation of hydroxyalkoxysilanol ($[Si(R)_{x-n}(OH)_n]$)-type products. In the case of the inorganic silicon compound, the process can be carried out according to the following equation, in which mainly mixed-composition (hetero) polysilicic acids are formed by acid hydrolysis:

$$[M^{n+}(SiO^-)_n] + xH_3O^+ = [SiO_x(OH)_{4-2x}] + (x-1)H_2O + M^{n+}$$

In the case of both organic silicon compounds and inorganic silicate compounds, depending on the reaction conditions used, mixed-combination products are formed in certain reactions, which can be represented by the formulas $SiR_{x-n}(OH)_n$ and $SiO_x(OH)_n$ (hereinafter: 'hydroxide intermediates).

It has been found that when the above two processes, the base-catalyzed copolymerization reaction of the organic silicon compound and the acid hydrolysis of the inorganic silicate compound, are carried out, without limitation, in a mixture of alkyl glycol, preferably 1,2-propylene glycol and polypropylene glycol, these hydroxide intermediates can be stabilized and subjected to further addition or condensation reactions with both the glycol compounds and the polymer content of the polystyrene/polymer mixtures, furthermore that these intermediate compounds can be reacted with polymer particles of the desired polystyrene/polymer blends significantly more efficiently, if the above processes are performed with the addition/in the presence of small particle size, high specific surface foam glass beads because the role of extremely small-sized foam beads in the reactions is not limited to the functions of charge separator and charge carrier played in surface catalysis. The basic copolymerization reaction of the organic silicon precursor with 1,2-propylene glycol—and the general formulas of the resulting intermediate products—is illustrated by the following scheme:

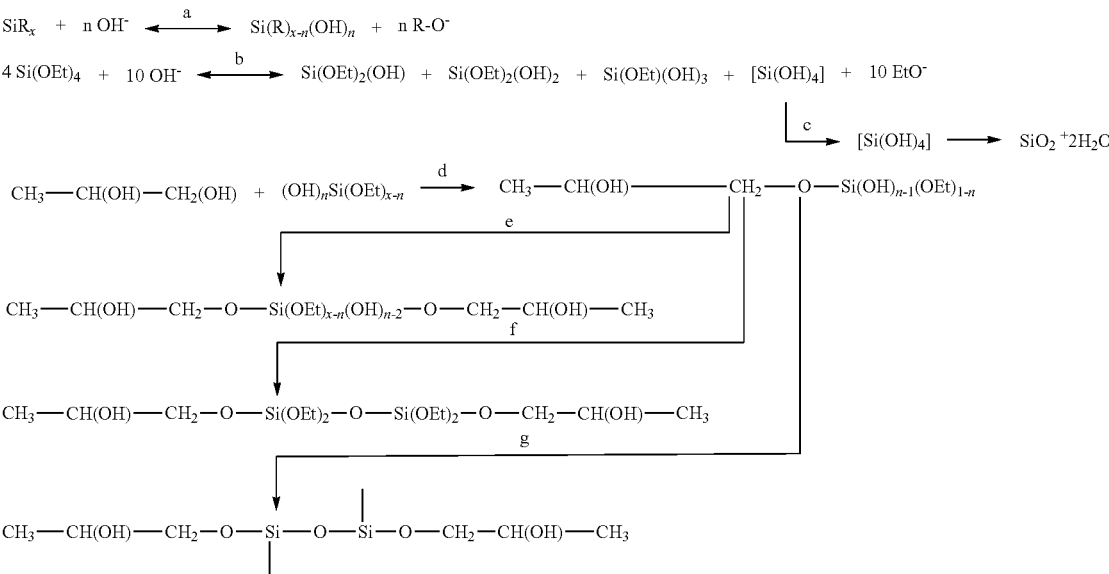

Where processes a and b illustrate the process of general hydrolysis of carboxysilanes and a particular compound, tetraethyl orthosilicate; process c, shows the decomposition of hydroxysilane; and process d shows the reaction of ethoxyhydroxysilane with 1,2-propylene glycol. Processes marked e, f and g illustrate the possible copolymerization products formed in reaction d.

It has also been found that the administration schedule of the compounds used in the process, their relative ratio, the temperature used and the appropriate pH level all greatly influence the outcome of the reactions and thus the characteristics of the admixture compositions. It has been found that the adequate compounds are most preferably formed in reaction mixtures in which the molar ratio of $n_{1,2\text{-}PG}/n_{n\text{-}BA}$ is in the range of 5:1 to 15:1, and the molar ratio of $n_{Na2SO3}/n_{n\text{-}BA}$ is 5:1 to 50:1, and the molar ratio of $n_{Na2SiO3}/n_{1,2\text{-}PG}$ is in the range of 1:1 to 4:1.

It has also been stated that the size distribution and reactivity of the polystyrene/glycol copolymer polymer silica and polystyrene/polymer silica microparticles formed in the reaction depend to a large extent on the temperature used in the process and the $n_{Na2sio3}/n_{polisztyrene}$ mole ratios applied which mole ratios can preferably be given in the range between 5:1 and 40:1.

Based on the above, the substeps of the process are as follows:

1. Preparation of a solution of tetraethyl orthosilicate, 1,2-propylene glycol, polypropylene glycol compounds and dichloromethane solvent
2. Addition of N-butylamine catalyst and foam glass beads to the solution described in Point 1
3. Addition of sodium silicate solution to the mixture
4. Addition of a catalyst containing aluminium chloride to the mixture
5. Acidic hydrolysis by the administration of a solution of given pH level
1-5.: Preparation of a glycol-silica copolymer/glycol-polymersilica/silicate suspension (masterbatch I)
6. Preparation of a two-component synthetic resin solution 7. Preparation of a polystyrene solution or polystyrene/polymer mixture using dichloromethane solvent or dichloromethane/isopropyl alcohol solvent mixture
6-7.: Preparation of synthetic resin-PS/polymer emulsion (masterbatch II)
8. Mixing master batches I and II
9A. To produce a liquid preparation, dilution and homogenization after adding an organic solvent mixture
9B. To produce a solid preparation, evaporation of the solvents and drying after adding solid admixtures to the product.

In the following, specific embodiments of the process for preparing the admixture compositions are presented, without, however, limiting the solutions to the examples.

In examples of the process shown in the first place (Examples A1 to A10), the admixture composition formed as a liquid dispersion/suspension, while in the further examples (Examples B1 to B5) the product obtained during the given processes is solid granules.

EXAMPLE A1

To a 250 ml flask was added 10 ml of tetraethyl ortho-silicate (TEOS), 20 ml of propylene glycol (1,2-PG), 5 ml of polypropylene glycol (PPG P400), 50 ml of dichloromethane (DCM) and 5 ml of n-butylamine (n-BA), the resulting mixture of pH 8.4, was then stirred with a magnetic hot plate stirrer, protected from light, while its temperature was gradually raised to 55° C. at cc. 3-5° C./min heating rate. After this, the mixture was stirred for 1 hour at this temperature. The product obtained in this reaction was a slightly opaque, viscous solution (step 1.).

To a 1000 ml beaker was added 100 g of foam glass beads, then the solution synthesised in the first step was poured slowly into the beaker's content, while it was stirred smoothly with a glass stick to mix. To the resulting mixture was added 200 ml of approx. 40% liquid glass solution* at 10 ml/min flow-rate, while it was stirred continuously, and the pH of the mixture increased to cc. 9.2 (steps 2, and 3.).

To the mixture produced in steps 1-3. was added 5 g of $Al(OH)_3:AlCl_3=100:1^{**}$ catalyst, and the mixture was vigorously stirred with an overhead stirrer. When starting the dosing, the irradiation of the reaction system is also started with cc. 350 nm UV light for 2 minutes, while the temperature was kept at 30° C. (step 4.).

The reaction system was stirred for 30 minutes, then the mixture was allowed to cool to room temperature while it was stirred continuously (step 5.).

Then the synthetic resin mixture, which is the basis of the synthetic resin matrix, was prepared in a 500 ml beaker, using polyol (component A) and polyisocyanate crosslinker (component B) in a volumetric ratio of 1:1, i.e. 100 ml of component A was mixed with 100 ml of component B while it was stirred continuously (step 6.).

The mixture obtained was a very opaque, pale yellow mixture.

To the solution obtained in step 6 was added 10 g of 10 w/w % polystyrene solution****, 50 ml of dichloromethane and additional 10 g of $A(OH)_3:AlCl_3=100:1$ catalyst, while the mixture was stirred continuously (step 7.).

During the next step, masterbatch I prepared in steps 1-5. and masterbatch II prepared in steps 6-7 were poured together into a 1000 ml beaker, and the reaction system was stirred with an overhead stirrer at 25° C. for 1 hour (step 8.).

Finally, the off-white suspension was mixed with 100 ml of dichloromethane/isopropyl alcohol/water mixture of 20/60/20 (v/v) and homogenized by continuous stirring for 3 hours (step 9A).

The product obtained was an off-white suspension with a typical density of 1.32 $g/cm^3$.

EXAMPLE A2

To a 250 ml flask was added 10 ml of tetraethyl orthosilicate (TEOS), 20 ml of propylene glycol (1,2-PG), 5 ml of polypropylene glycol (PPG), 50 ml of dichloromethane (DCM) and 2.5 ml of n-butylamine (n-BA), the resulting mixture of pH 8.2, was then stirred with a magnetic hot plate stirrer, protected from light, while its temperature was gradually raised to 55° C. at cc. 3-5° C./min heating rate. After this, the mixture was stirred for 1 hour at this temperature. The product obtained in this reaction was a slightly opaque, viscous solution (step 1.).

To a 1000 ml beaker was added 100 g of foam glass beads, then the solution synthetised in the first step was poured slowly into the beaker's content, while it was stirred smoothly with a glass stick to mix. To the resulting mixture was added 95 ml of approx. 40% liquid glass solution* at 6 ml/min flow-rate, while it was stirred continuously (steps 2, and 3.).

To the mixture produced in steps 1-3. was added 2 g of $Al(OH)_3:AlCl_3=100:1^{**}$ catalyst, and the mixture was vigorously stirred with an overhead stirrer. When starting the dosing, the irradiation of the reaction system is also started with cc. 350 nm UV light for 2 minutes, while the temperature was kept at 30° C. (step 4.).

The reaction system was stirred for 30 minutes, then the mixture was allowed to cool to room temperature while it was stirred continuously. Then to the suspension was added 16.7 ml of 18 w/w % hydrochlorid acid solution at 5 ml/min flow-rate, while the pH of the mixture was decreased to 7.4 (step 5.).

Then the synthetic resin mixture, which is the basis of the synthetic resin matrix, was prepared in a 1000 ml beaker, using polyol (component A) and polyisocyanate crosslinker (component B) in a volumetric ratio of 1:1, i.e. 100 ml of component A was mixed with 100 ml of component B while it was stirred continuously (step 6.). The mixture obtained was a very opaque, pale yellow mixture.

To the solution obtained in step 6 was added 10 ml of 10 w/w % polystyrene solution****, 350 ml of dichloromethane and additional 10 g of $Al(OH)_3:ACl_3=100:1$ catalyst, while the mixture was stirred continuously (step 7.).

During the next step, masterbatch I prepared in steps 1-5. and masterbatch II prepared in steps 6-7 were poured together into a 1500 ml beaker, and the reaction system was stirred vigorously with an overhead stirrer at 25° C. for 1 hour (step 8.).

Finally, the off-white suspension was mixed with 160 ml of dichloromethane/water mixture of 60/40 (V/V) and homogenized by continuous stirring for 3 hours (step 9A).

The product obtained was an off-white suspension with a typical density of 1.23 $g/cm^3$.

EXAMPLE A3

To a 250 ml flask was added 10 ml of tetraethyl orthosilicate (TEOS), 20 ml of propylene glycol (1,2-PG), 5 ml of polypropylene glycol (PPG), 50 ml of dichloromethane (DCM) and 5 ml of n-butylamine (n-BA), the resulting mixture of pH 8.3, was then stirred with a magnetic hot plate stirrer, protected from light, while its temperature was gradually raised to 65° C. at cc. 3-5° C./min heating rate. After this, the mixture was stirred for 1 hour at this temperature. The product obtained in this reaction was a slightly opaque, viscous solution (step 1.).

To a 1000 ml beaker was added 100 g of foam glass beads, then the solution synthetized in the first step was poured slowly into the beaker's content, while it was stirred smoothly with a glass stick to mix. To the resulting mixture was added 350 ml of approx. 40% liquid glass solution* at 6 ml/min flow-rate, while it was stirred continuously (steps 2, and 3.).

To the mixture produced in steps 1-3. was added 5 g of $Al(OH)_3:AlCl_3=100:1^{**}$ catalyst, and the mixture was vigorously stirred with an overhead stirrer. When starting the dosing, the irradiation of the reaction system is also started with cc. 350 nm UV light for 0.5 minutes, while the temperature was kept at 30° C. (step 4.).

The reaction system was stirred for 30 minutes, then the mixture was allowed to cool to room temperature while it was stirred continuously. Then to the suspension was added 61.5 ml of 18 w/w % hydrochlorid acid solution at 5 ml/min flow-rate, while the pH of the mixture was decreased to 7.7 (step 5.).

Then the synthetic resin mixture, which is the basis of the synthetic resin matrix, was prepared in a 1000 ml beaker, using polyol (component A) and polyisocyanate crosslinker (component B) in a volumetric ratio of 1:1, i.e. 100 ml of component A was mixed with 100 ml of component B while it was stirred continuously (step 6.).

The mixture obtained was a very opaque, pale yellow mixture.

To the solution obtained in step 6 was added 20 ml of 10 w/w % polystyrene solution****, and 100 ml of dichloromethane, while the mixture was stirred continuously (step 7.).

During the next step, masterbatch I prepared in steps 1-5. and masterbatch II prepared in steps 6-7 were poured together into a 1500 ml beaker, and the reaction system was stirred vigorously with an overhead stirrer at 25° C. for 1 hour (step 8.).

Finally, the off-white suspension was mixed with 160 ml of dichloromethane/water mixture of 60/40 (V/V) and homogenized by continuous stirring for 3 hours (step 9A).

The product obtained was an off-white suspension with a typical density of 1.23 g/cm$^3$.

EXAMPLE A4

To a 250 ml flask was added 10 ml of tetraethyl orthosilicate (TEOS), 20 ml of propylene glycol (1,2-PG), 5 ml of polypropylene glycol (PPG), 50 ml of dichloromethane (DCM) and 5 ml of n-butylamine (n-BA), the resulting mixture of pH 8.4, was then stirred with a magnetic hot plate stirrer, protected from light, while its temperature was gradually raised to 55° C. at cc. 3-5° C./min heating rate. After this, the mixture was stirred for 1 hour at this temperature. The product obtained in this reaction was a slightly opaque, viscous solution (step 1.).

To a 1000 ml beaker was added 100 g of foam glass beads, then the solution synthetized in the first step was poured slowly into the beaker's content, while it was stirred smoothly with a glass stick to mix. To the resulting mixture was added 115 ml of approx. 40% liquid glass solution* at 6 ml/min flow-rate, while it was stirred continuously (steps 2, and 3.).

To the mixture produced in steps 1-3. was added 2.5 g of Al(OH)$_3$:AlCl$_3$=10:1** catalyst, and the mixture was vigorously stirred with an overhead stirrer. When starting the dosing, the irradiation of the reaction system is also started with cc. 350 nm UV light for 2 minutes, while the temperature was kept at 30° C. (step 4.).

The reaction system was stirred for 30 minutes, then the mixture was allowed to cool to room temperature while it was stirred continuously. Then to the suspension was added 20.2 ml of 18 w/w % hydrochlorid acid solution at 5 ml/min flow-rate, and the system was stirred again for 30 minutes, while the pH of the mixture was decreased to 7.9 (step 5.).

Then the synthetic resin mixture, which is the basis of the synthetic resin matrix, was prepared in a 1000 ml beaker, using polyol (component A) and polyisocyanate crosslinker (component B) in a volumetric ratio of 1:1, i.e. 100 ml of component A was mixed with 100 ml of component B while it was stirred continuously (step 6.).

The mixture obtained was a very opaque, pale yellow mixture.

To the solution obtained in step 6 was added 50 ml of 10 w/w % polystyrene solution****, 150 ml of dichloromethane and additional 10 g of Al(OH)$_3$:AlCl$_3$=10:1 catalyst, while the mixture was stirred continuously (step 7.).

During the next step, masterbatch I prepared in steps 1-5. and masterbatch II prepared in steps 6-7 were poured together into a 1500 ml beaker, and the reaction system was stirred vigorously with an overhead stirrer at 25° C. for 1 hour (step 8.).

Finally, the off-white suspension was mixed with 160 ml of dichloromethane/water mixture of 60/40 (V/V) and homogenized by continuous stirring for 3 hours (step 9A).

EXAMPLE A5

To a 250 ml flask was added 10 ml of tetraethyl orthosilicate (TEOS), 20 ml of propylene glycol (1,2-PG), 5 ml of polypropylene glycol (PPG), 50 ml of dichloromethane (DCM) and 2.5 ml of n-butylamine (n-BA), the resulting mixture of pH 7.8, was then stirred with a magnetic hot plate stirrer, protected from light, while its temperature was gradually raised to 65° C. at cc. 3-5° C./min heating rate. After this, the mixture was stirred for 1 hour at this temperature. The product obtained in this reaction was a slightly opaque, viscous solution (step 1.).

To a 1000 ml beaker was added 100 g of foam glass beads, then the solution synthetized in the first step was poured slowly into the beaker's content, while it was stirred smoothly with a glass stick to mix. To the resulting mixture was added 400 ml of approx. 40% liquid glass solution* at 6 ml/min flow-rate, while it was stirred continuously (steps 2, and 3.).

To the mixture produced in steps 1-3. was added 8 g of Al(OH)$_3$:AlCl$_3$=10:1** catalyst, and the mixture was vigorously stirred with an overhead stirrer. When starting the dosing, the irradiation of the reaction system is also started with cc. 350 nm UV light for 1.5 minutes, while the temperature was kept at 30° C. (step 4.).

The reaction system was stirred for 30 minutes, then the mixture was allowed to cool to room temperature while it was stirred continuously (step 5.).

Then the synthetic resin mixture, which is the basis of the synthetic resin matrix, was prepared in a 1000 ml beaker, using polyol (component A) and polyisocyanate crosslinker (component B) in a volumetric ratio of 1:1, i.e. 100 ml of component A was mixed with 100 ml of component B while it was stirred continuously (step 6.). The mixture obtained was a very opaque, pale yellow mixture.

To the solution obtained in step 6 was added 50 ml of 10 w/w % polystyrene solution**** and 150 ml of dichloromethane, while the mixture was stirred continuously (step 7.).

During the next step, masterbatch I prepared in steps 1-5. and masterbatch II prepared in steps 6-7 were poured together into a 1500 ml beaker, and the reaction system was stirred vigorously with an overhead stirrer at 25° C. for 1 hour (step 8.).

Finally, the obtained off-white suspension was mixed with 160 ml of dichloromethane/water mixture of 60/40 (V/V) and homogenized by continuous stirring for 3 hours (step 9A).

EXAMPLE A6

To a 250 ml flask was added 10 ml of tetraethyl orthosilicate (TEOS), 20 ml of propylene glycol (1,2-PG), 5 ml of polypropylene glycol (PPG), 50 ml of dichloromethane (DCM) and 2.5 ml of n-butylamine (n-BA), the resulting mixture of pH 8.1, was then stirred with a magnetic hot plate stirrer, protected from light, while its temperature was gradually raised to 65° C. at cc. 3-5° C./min heating rate. After this, the mixture was stirred for 1 hour at this temperature. The product obtained in this reaction was a slightly opaque, viscous solution (step 1.).

To a 1000 ml beaker was added 100 g of foam glass beads, then the solution synthetized in the first step was poured slowly into the beaker's content, while it was stirred smoothly with a glass stick to mix. To the resulting mixture was added 125 nil of approx. 40% liquid glass solution* at 6 ml/min flow-rate, while it was stirred continuously (steps 2, and 3.).

To the mixture produced in steps 1-3. was added 2 g of $Al(OH)_3:AlCl_3=100:1^{**}$ catalyst, and the mixture was vigorously stirred with an overhead stirrer. When starting the dosing, the irradiation of the reaction system is also started with cc. 350 nm UV light for 1.5 minutes, while the temperature was kept at 30° C. (step 4.).

The reaction system was stirred for 30 minutes, then the mixture was allowed to cool to room temperature while it was stirred continuously. Then to the suspension was added 22.0 ml of 18 w/w % hydrochlorid acid solution at 5 ml/min flow-rate, and the system was stirred again for 30 minutes, while the pH of the mixture was decreased to 7.6 (step 5.).

Then the synthetic resin mixture, which is the basis of the synthetic resin matrix, was prepared in a 1000 ml beaker, using polyol (component A) and polyisocyanate crosslinker (component B) in a volumetric ratio of 1:1, i.e. 100 ml of component A was mixed with 100 ml of component B while it was stirred continuously (step 6.). The mixture obtained was a very opaque, pale yellow mixture.

To the solution obtained in step 6 was added 50 ml of 10 w/w % polystyrene solution****,150 ml of dichloromethane and additional 8 g of $Al(OH)_3:AlCl_3=100:1$ catalyst, while the mixture was stirred continuously (step 7.).

During the next step, masterbatch I prepared in steps 1-5. and masterbatch II prepared in steps 6-7 were poured together into a 1500 ml beaker, and the reaction system was stirred vigorously with an overhead stirrer at 25° C. for 1 hour (step 8.).

Finally, the obtained off-white suspension was mixed with 160 ml of dichloromethane/water mixture of 60/40 (V/V) and homogenized by continuous stirring for 3 hours (step 9A).

EXAMPLE A7

To a 250 ml flask was added 10 ml of tetraethyl orthosilicate (TEOS), 20 ml of propylene glycol (1,2-PG), 5 ml of polypropylene glycol (PPG), 50 ml of dichloromethane (DCM) and 2.5 ml of n-butylamine (n-BA), the resulting mixture of pH 8.0 was then stirred with a magnetic hot plate stirrer, protected from light, while its temperature was gradually raised to 75° C. at cc. 3-5° C./min heating rate. After this, the mixture was stirred for 1 hour at this temperature. The product obtained in this reaction was a slightly opaque, viscous solution (step 1.).

To a 1000 ml beaker was added 100 g of foam glass beads, then the solution synthetized in the first step was poured slowly into the beaker's content, while it was stirred smoothly with a glass stick to mix. To the resulting mixture was added 150 ml of approx. 40% liquid glass solution* at 6 ml/min flow-rate, while it was stirred continuously (steps 2, and 3.).

To the mixture produced in steps 1-3. was added 2 g of $Al(OH)_3:AlCl_3=10:1^{**}$ catalyst, and the mixture was vigorously stirred with an overhead stirrer. When starting the dosing, the irradiation of the reaction system is also started with cc. 350 nm UV light for 1.5 minutes, while the temperature was kept at 30° C. (step 4.).

The reaction system was stirred for 30 minutes, then the mixture was allowed to cool to room temperature while it was stirred continuously. Then to the suspension was added 26.3 ml of 18 w/w % hydrochlorid acid solution at 5 ml/min flow-rate, and the system was stirred again for 30 minutes, while the pH of the mixture was decreased to 7.6 (step 5.).

Then the synthetic resin mixture, which is the basis of the synthetic resin matrix, was prepared in a 1000 ml beaker, using polyol (component A) and polyisocyanate crosslinker (component B) in a volumetric ratio of 1:1, i.e. 50 ml of component A was mixed with 50 ml of component B while it was stirred continuously (step 6.). The mixture obtained was a very opaque, pale yellow mixture.

To the solution obtained in step 6 was added additional 5 g of $Al(OH)_3:AlCl_3=10:1$ catalyst, 20 ml of 10 w/w % polystyrene solution****and 100 ml of dichloromethane, while the mixture was stirred continuously (step 7.).

During the next step, masterbatch I prepared in steps 1-5. and masterbatch II prepared in steps 6-7 were poured together into a 1500 ml beaker, and the reaction system was stirred vigorously with an overhead stirrer at 25° C. for 1 hour (step 8.).

Finally, the obtained off-white suspension was mixed with 160 ml of dichloromethane/water mixture of 60/40 (V/V) and homogenized by continuous stirring for 3 hours (step 9A).

EXAMPLE A8

To a 250 ml flask was added 10 ml of tetraethyl orthosilicate (TEOS), 20 ml of propylene glycol (1,2-PG), 5 ml of polypropylene glycol (PPG), 50 ml of dichloromethane (DCM) and 2 ml of n-butylamine (n-BA), the resulting mixture of pH 7.8, was then stirred with a magnetic hot plate stirrer, protected from light, while its temperature was gradually raised to 65° C. at cc. 3-5° C./min heating rate. After this, the mixture was stirred for 1 hour at this temperature. The product obtained in this reaction was a slightly opaque, viscous solution (step 1.).

To a 1000 ml beaker was added 100 g of foam glass beads, then the solution synthetized in the first step was poured slowly into the beaker's content, while it was stirred smoothly with a glass stick to mix. To the resulting mixture was added 175 ml of approx. 40% liquid glass solution* at 6 ml/min flow-rate, while it was stirred continuously (steps 2, and 3.).

To the mixture produced in steps 1-3. was added 2.5 g of $Al(OH)_3:AlCl_3=10:1^{**}$ catalyst, and the mixture was vigorously stirred with an overhead stirrer. When starting the dosing, the irradiation of the reaction system is also started with cc. 350 nm UV light for 2 minutes, while the temperature was kept at 30° C. (step 4.).

The reaction system was stirred for 30 minutes, then the mixture was allowed to cool to room temperature while it was stirred continuously. Then to the suspension was added 30.7 ml of 18 w/w % hydrochlorid acid solution at 5 ml/min flow-rate, and the system was stirred again for 30 minutes, while the pH of the mixture was decreased to 7.6 (step 5.).

Then the synthetic resin mixture, which is the basis of the synthetic resin matrix, was prepared in a 1000 ml beaker, using polyol (component A) and polyisocyanate crosslinker (component B) in a volumetric ratio of 1:1, i.e. 50 ml of component A was mixed with 50 ml of component B while it was stirred continuously (step 6.). The mixture obtained was a very opaque, pale yellow mixture.

To the solution obtained in step 6 was added additional 5 g of Al(OH)$_3$:AlCl$_3$=10:1 catalyst, 50 ml of 10 w/w % polystyrene solution****and 150 ml of dichloromethane, while the mixture was stirred continuously (step 7.).

During the next step, masterbatch I prepared in steps 1-5. and masterbatch II prepared in steps 6-7 were poured together into a 1500 ml beaker, and the reaction system was stirred vigorously with an overhead stirrer at 25° C. for 1 hour (step 8.).

Finally, the obtained off-white suspension was mixed with 160 ml of dichloromethane/water mixture of 60/40 (V/V) and homogenized by continuous stirring for 3 hours (step 9A).

EXAMPLE A9

To a 250 nil flask was added 10 ml of tetraethyl orthosilicate (TEOS), 20 ml of propylene glycol (1,2-PG), 5 ml of polypropylene glycol (PPG), 50 ml of dichloromethane (DCM) and 2.5 ml of n-butylamine (n-BA), the resulting mixture of pH 8.0 was then stirred with a magnetic hot plate stirrer, protected from light, while its temperature was gradually raised to 75° C. at cc. 3-5° C./min heating rate. After this, the mixture was stirred for 1 hour at this temperature. The product obtained in this reaction was a slightly opaque, viscous solution (step 1.).

To a 1000 ml beaker was added 100 g of foam glass beads, then the solution synthetized in the first step was poured slowly into the beaker's content, while it was stirred smoothly with a glass stick to mix. To the resulting mixture was added 200 ml of approx. 40% liquid glass solution* at 6 ml/min flow-rate, while it was stirred continuously (steps 2. and 3.).

To the mixture produced in steps 1-3. was added 2.5 g of Al(OH)$_3$:AlCl$_3$=100:1** catalyst, and the mixture was vigorously stirred with an overhead stirrer. When starting the dosing, the irradiation of the reaction system is also started with cc. 350 nm UV light for 2 minutes, while the temperature was kept at 30° C. (step 4.).

The reaction system was stirred for 30 minutes, then the mixture was allowed to cool to room temperature while it was stirred continuously. Then to the suspension was added 16.7 ml of 18 w/w % hydrochlorid acid solution at 5 ml/min flow-rate, and the system was stirred again for 30 minutes, while the pH of the mixture was decreased to 7.4 (step 5.).

Then the synthetic resin mixture, which is the basis of the synthetic resin matrix, was prepared in a 1000 ml beaker, using polyol (component A) and polyisocyanate crosslinker (component B) in a volumetric ratio of 1:1, i.e. 100 ml of component A was mixed with 100 ml of component B while it was stirred continuously (step 6.). The mixture obtained was a very opaque, pale yellow mixture.

To the solution obtained in step 6 was added 20 ml of 10 w/w % polystyrene solution****, 350 ml of dichloromethane and additional 5 g of Al(OH)$_3$:AlCl$_3$=10:1 catalyst, while the mixture was stirred continuously (step 7.).

During the next step, masterbatch I prepared in steps 1-5. and masterbatch II prepared in steps 6-7 were poured together into a 1500 ml beaker, and the reaction system was stirred vigorously with an overhead stirrer at 25° C. for 1 hour (step 8.).

Finally, the obtained off-white suspension was mixed with 160 ml of dichloromethane/water mixture of 60/40 (V/V) and homogenized by continuous stirring for 3 hours (step 9A).

EXAMPLE A10

To a 250 ml flask was added 10 ml of tetraethyl orthosilicate (TEOS), 20 ml of propylene glycol (1,2-PG), 5 ml of polypropylene glycol (PPG), 50 ml of dichloromethane (DCM) and 2 ml of n-butylamine (n-BA), the resulting mixture of pH 7.8, was then stirred with a magnetic hot plate stirrer, protected from light, while its temperature was gradually raised to 75° C. at cc. 3-5° C./min heating rate. After this, the mixture was stirred for 1 hour at this temperature. The product obtained in this reaction was a slightly opaque, viscous solution (step 1.).

To a 1000 ml beaker was added 100 g of foam glass beads, then the solution synthetised in the first step was poured slowly into the beaker's content, while it was stirred smoothly with a glass stick to mix. To the resulting mixture was added 400 ml of approx. 40% liquid glass solution* at 6 ml/min flow-rate, while it was stirred continuously (steps 2, and 3.).

To the mixture produced in steps 1-3. was added 15 g of Al(OH)$_3$:AlCl$_3$=10:1** catalyst, and the mixture was vigorously stirred with an overhead stirrer. When starting the dosing, the irradiation of the reaction system is also started with cc. 350 nm UV light for 2 minutes, while the temperature was kept at 30° C. (step 4.).

The reaction system was stirred for 30 minutes, then the mixture was allowed to cool to room temperature while it was stirred continuously (step 5.).

Then the synthetic resin mixture, which is the basis of the synthetic resin matrix, was prepared in a 1000 ml beaker, using polyol (component A) and polyisocyanate crosslinker (component B) in a volumetric ratio of 1:1, i.e. 50 ml of component A was mixed with 50 ml of component B while it was stirred continuously (step 6.). The mixture obtained was a very opaque, pale yellow mixture.

To the solution obtained in step 6 was added additional 15 g of Al(OH)$_3$:AlCl$_3$=10:1 catalyst, 50 ml of 10 w/w % polystyrene solution**** and 150 ml of dichloromethane, while the mixture was stirred continuously (step 7.).

During the next step, masterbatch I prepared in steps 1-5. and masterbatch II prepared in steps 6-7 were poured together into a 1500 ml beaker, and the reaction system was stirred vigorously with an overhead stirrer at 25° C. for 1 hour (step 8.).

Finally, the obtained off-white suspension was mixed with 160 ml of dichloromethane/water mixture of 60/40 (V/V) and homogenized by continuous stirring for 3 hours (step 9A).

EXAMPLE B1

To a 250 ml flask was added 10 ml of tetraethyl orthosilicate (TEOS), 20 ml of propylene glycol (1,2-PG), 5 ml of polypropylene glycol (PPG), 50 ml of dichloromethane (DCM) and 2 ml of n-butylamine (n-BA), the resulting mixture of pH 7.8, was then stirred with a magnetic hot plate stirrer, protected from light, while its temperature was gradually raised to 65° C. at cc. 3-5° C./min heating rate. After this, the mixture was stirred for 1 hour at this temperature. The product obtained in this reaction was a slightly opaque, viscous solution (step 1.).

To a 1000 ml beaker was added 100 g of foam glass beads, then the solution synthetized in the first step was poured slowly into the beaker's content, while it was stirred smoothly with a glass stick to mix. To the resulting mixture was added 95 ml of approx. 40% liquid glass solution* at 6 ml/min flow-rate, while it was stirred continuously (steps 2, and 3.).

To the mixture produced in steps 1-3. was added 2.5 g of $Al(OH)_3$:$AlCl_3$=10:1** catalyst, and the mixture was vigorously stirred with an overhead stirrer. When starting the dosing, the irradiation of the reaction system is also started with cc. 350 nm UV light for 1.5 minutes, while the temperature was kept at 30° C. (step 4.).

The reaction system was stirred for 30 minutes, then the mixture was allowed to cool to room temperature while it was stirred continuously. Then to the suspension was added 16.7 ml of 18 w/w % hydrochlorid acid solution at 5 ml/min flow-rate, and the system was stirred again for 30 minutes, while the pH of the mixture was decreased to 7.4 (step 5.).

Then the synthetic resin mixture, which is the basis of the synthetic resin matrix, was prepared in a 1000 ml beaker, using polyol (component A) and polyisocyanate crosslinker (component B) in a volumetric ratio of 1:1, i.e. 50 ml of component A was mixed with 50 ml of component B while it was stirred continuously (step 6.). The mixture obtained was a very opaque, pale yellow mixture.

To the solution obtained in step 6 was added 25 ml of 10 w/w % polystyrene solution**** and 100 ml of dichloromethane, while the mixture was stirred continuously (step 7.).

During the next step, masterbatch I prepared in steps 1-5. and masterbatch II prepared in steps 6-7 were poured together into a 1500 ml beaker, and the reaction system was stirred vigorously with an overhead stirrer at 25° C. for 1 hour (step 8.).

Finally, the obtained off-white suspension was dried in teflon coated metal tray or in a heatproof dish at 65° C. for 1 hour, while it was stirred continuously, followed by mixing 5 g of metakaolin, 8 g of coal fly ash and 20 g of aluminium hydroxide to the granulate, then the resulting mixture was grinded and dried at 25° C. for 6 hours (step 9B.).

The product obtained from this procedure was an off-white or grey, solid, small particle sized granulate.

EXAMPLE B2

To a 250 ml flask was added 10 ml of tetraethyl orthosilicate (TEOS), 20 ml of propylene glycol (1,2-PG), 5 ml of polypropylene glycol (PPG), 50 ml of dichloromethane (DCM) and 2 ml of n-butylamine (n-BA), the resulting mixture of pH 7.8, was then stirred with a magnetic hot plate stirrer, protected from light, while its temperature was gradually raised to 55° C. at cc. 3-5° C./min heating rate. After this, the mixture was stirred for 1 hour at this temperature. The product obtained in this reaction was a slightly opaque, viscous solution (step 1.).

To a 1000 ml beaker was added 100 g of foam glass beads, then the solution synthetized in the first step was poured slowly into the beaker's content, while it was stirred smoothly with a glass stick to mix. To the resulting mixture was added 115 ml of approx. 40% liquid glass solution* at 6 ml/min flow-rate, while it was stirred continuously (steps 2, and 3.).

To the mixture produced in steps 1-3. was added 5 g of $Al(OH)_3$:$AlCl_3$=10:1** catalyst, and the mixture was vigorously stirred with an overhead stirrer. When starting the dosing, the irradiation of the reaction system is also started with cc. 350 nm UV light for 1.5 minutes, while the temperature was kept at 30° C. (step 4.).

The reaction system was stirred for 30 minutes, then the mixture was allowed to cool to room temperature while it was stirred continuously. Then to the suspension was added 20.2 ml of 18 w/w % hydrochlorid acid solution at 5 ml/min flow-rate, and the system was stirred again for 30 minutes, while the pH of the mixture was decreased to 7.4 (step 5.).

Then the synthetic resin mixture, which is the basis of the synthetic resin matrix, was prepared in a 1000 ml beaker, using polyol (component A) and polyisocyanate crosslinker (component B) in a volumetric ratio of 1:1, i.e. 50 ml of component A was mixed with 50 ml of component B while it was stirred continuously (step 6.). The mixture obtained was a very opaque, pale yellow mixture.

To the solution obtained in step 6 was added 25 ml of 10 w/w % polystyrene solution****, 150 ml of dichloromethane and additional 10 g of $Al(OH)_3$:$AlCl_3$=10:1 catalyst, while the mixture was stirred continuously (step 7.).

During the next step, masterbatch I prepared in steps 1-5. and masterbatch II prepared in steps 6-7 were poured together into a 1500 ml beaker, and the reaction system was stirred vigorously with an overhead stirrer at 25° C. for 1 hour (step 8.).

Finally, the obtained off-white suspension was dried in teflon coated metal tray or in a heatproof dish at 65° C. for 1 hour, while it was stirred continuously, followed by mixing 5 g of metakaolin, 8 g of coal fly ash and 20 g of aluminium hydroxide to the granulate, then the resulting mixture was grinded and dried at 25° C. for 6 hours (step 9B.).

EXAMPLE B3

To a 250 ml flask was added 10 ml of tetraethyl orthosilicate (TEOS), 20 ml of propylene glycol (1,2-PG), 5 ml of polypropylene glycol (PPG), 50 ml of dichloromethane (DCM) and 2 ml of n-butylamine (n-BA), the resulting mixture of pH 7.9, was then stirred with a magnetic hot plate stirrer, protected from light, while its temperature was gradually raised to 55° C. at cc. 3-5° C./min heating rate. After this, the mixture was stirred for 1 hour at this temperature. The product obtained in this reaction was a slightly opaque, viscous solution (step 1.).

To a 1000 ml beaker was added 100 g of foam glass beads, then the solution synthetized in the first step was poured slowly into the beaker's content, while it was stirred smoothly with a glass stick to mix. To the resulting mixture was added 150 ml of approx. 40% liquid glass solution* at 6 ml/min flow-rate, while it was stirred continuously (steps 2, and 3.).

To the mixture produced in steps 1-3. was added 10 g of $Al(OH)_3$:$AlCl_3$=10:1** catalyst, and the mixture was vigorously stirred with an overhead stirrer. When starting the dosing, the irradiation of the reaction system is also started with cc. 350 nm UV light for 1.5 minutes, while the temperature was kept at 30° C. (step 4.).

The reaction system was stirred for 30 minutes, then the mixture was allowed to cool to room temperature while it was stirred continuously. Then to the suspension was added 26.3 ml of 18 w/w % hydrochlorid acid solution at 5 ml/min flow-rate, and the system was stirred again for 30 minutes, while the pH of the mixture was decreased to 7.3 (step 5.).

Then the synthetic resin mixture, which is the basis of the synthetic resin matrix, was prepared in a 1000 ml beaker, using polyol (component A) and polyisocyanate crosslinker (component B) in a volumetric ratio of 1:1, i.e. 50 ml of component A was mixed with 50 ml of component B while it was stirred continuously (step 6.). The mixture obtained was a very opaque, pale yellow mixture.

To the solution obtained in step 6 was added additional 10 g of $Al(OH)_3$:$AlCl_3$=10:1 catalyst, 25 ml of 10 w/w % polystyrene solution****, 20 ml of 51 w/w % PVA solution and 100 ml of dichloromethane, while the mixture was stirred continuously (step 7.).

During the next step, masterbatch I prepared in steps 1-5. and masterbatch II prepared in steps 6-7 were poured together into a 1500 ml beaker, and the reaction system was stirred vigorously with an overhead stirrer at 25° C. for 1 hour (step 8.).

Finally, the obtained off-white suspension was dried in teflon coated metal tray or in a heatproof dish at 65° C. for 1 hour, while it was stirred continuously, followed by mixing 5 g of metakaolin, 8 g of coal fly ash and 20 g of aluminium hydroxide to the granulate, then the resulting mixture was grinded and dried at 25° C. for 6 hours (step 9B.).

EXAMPLE B4

To a 250 ml flask was added 10 ml of tetraethyl orthosilicate (TEOS), 20 ml of propylene glycol (1,2-PG), 5 ml of polypropylene glycol (PPG), 50 ml of dichloromethane (DCM) and 2.5 ml of n-butylamine (n-BA), the resulting mixture of pH 8.1, was then stirred with a magnetic hot plate stirrer, protected from light, while its temperature was gradually raised to 55° C. at cc. 3-5° C./min heating rate. After this, the mixture was stirred for 1 hour at this temperature. The product obtained in this reaction was a slightly opaque, viscous solution (step 1.).

To a 1000 ml beaker was added 100 g of foam glass beads, then the solution synthetized in the first step was poured slowly into the beaker's content, while it was stirred smoothly with a glass stick to mix. To the resulting mixture was added 150 ml of approx. 40% liquid glass solution* at 6 ml/min flow-rate, while it was stirred continuously (steps 2, and 3.).

To the mixture produced in steps 1-3. was added 10 g of $Al(OH)_3$:$AlCl_3$=10:1** catalyst, and the mixture was vigorously stirred with an overhead stirrer. When starting the dosing, the irradiation of the reaction system is also started with cc. 350 nm UV light for 1.5 minutes, while the temperature was kept at 30° C. (step 4.).

The reaction system was stirred for 30 minutes, then the mixture was allowed to cool to room temperature while it was stirred continuously. Then to the suspension was added 26.3 ml of 18 w/w % hydrochlorid acid solution at 5 ml/min flow-rate, and the system was stirred again for 30 minutes, while the pH of the mixture was decreased to 7.4 (step 5.).

Then the synthetic resin mixture, which is the basis of the synthetic resin matrix, was prepared in a 1000 ml beaker, using polyol (component A) and polyisocyanate crosslinker (component B) in a volumetric ratio of 1:1, i.e. 50 ml of component A was mixed with 50 ml of component B while it was stirred continuously (step 6.). The mixture obtained was a very opaque, pale yellow mixture.

To the solution obtained in step 6 was added additional 10 g of $Al(OH)_3$:$AlCl_3$=10:1 catalyst, 25 ml of 10 w/w % polystyrene solution****, 30 ml of 51% PVA solution and 100 ml of dichloromethane, while the mixture was stirred continuously (step 7.).

During the next step, masterbatch I prepared in steps 1-5. and masterbatch II prepared in steps 6-7 were poured together into a 1500 ml beaker, and the reaction system was stirred vigorously with an overhead stirrer at 25° C. for 1 hour (step 8.).

Finally, the obtained off-white suspension was dried in teflon coated metal tray or in a heatproof dish at 65° C. for 1 hour, while it was stirred continuously, followed by mixing 5 g of metakaolin, 8 g of coal fly ash and 20 g of aluminium hydroxide to the granulate, then the resulting mixture was grinded and dried at 25° C. for 6 hours (step 9B.).

EXAMPLE B5

To a 250 ml flask was added 10 ml of tetraethyl orthosilicate (TEOS), 20 ml of propylene glycol (1,2-PG), 5 ml of polypropylene glycol (PPG), 50 ml of dichloromethane (DCM) and 2.5 ml of n-butylamine (n-BA), the resulting mixture of pH 8.1, was then stirred with a magnetic hot plate stirrer, protected from light, while its temperature was gradually raised to 55° C. at cc. 3-5° C./min heating rate. After this, the mixture was stirred for 1 hour at this temperature. The product obtained in this reaction was a slightly opaque, viscous solution (step 1.).

To a 1000 ml beaker was added 100 g of foam glass beads, then the solution synthetized in the first step was poured slowly into the beaker's content, while it was stirred smoothly with a glass stick to mix. To the resulting mixture was added 200 ml of approx. 40% liquid glass solution* at 6 ml/min flow-rate, while it was stirred continuously (steps 2, and 3.).

To the mixture produced in steps 1-3. was added 10 g of $Al(OH)_3$:$AlCl_3$=10:1** catalyst, and the mixture was vigorously stirred with an overhead stirrer. When starting the dosing, the irradiation of the reaction system is also started with cc. 350 nm UV light for 1.5 minutes, while the temperature was kept at 30° C. (step 4.).

The reaction system was stirred for 30 minutes, then the mixture was allowed to cool to room temperature while it was stirred continuously. Then to the suspension was added 35.1 ml of 18 w/w % hydrochlorid acid solution at 5 ml/min flow-rate, and the system was stirred again for 30 minutes, while the pH of the mixture was decreased to 7.4 (step 5.).

Then the synthetic resin mixture, which is the basis of the synthetic resin matrix, was prepared in a 1000 ml beaker, using polyol (component A) and polyisocyanate crosslinker (component B) in a volumetric ratio of 1:1, i.e. 50 ml of component A was mixed with 50 ml of component B while it was stirred continuously (step 6.). The mixture obtained was a very opaque, pale yellow mixture.

To the solution obtained in step 6 was added 25 ml of 10 w/w % polystyrene solution****, 50 ml of 51 w/w % PVA solution, 150 nl of dichloromethane solvent and additional 10 g of Al(OH)$_3$:AlCl$_3$=10:1 catalyst, while the mixture was stirred continuously (step 7.).

During the next step, masterbatch I prepared in steps 1-5. and masterbatch II prepared in steps 6-7 were poured together into a 1500 ml beaker, and the reaction system was stirred vigorously with an overhead stirrer at 25° C. for 1 hour (step 8.).

Finally, the obtained off-white suspension was dried in teflon coated metal tray or in a heatproof dish at 65° C. for 1 hour, while it was stirred continuously, followed by mixing 5 g of metakaolin, 8 g of coal fly ash and 20 g of aluminium hydroxide to the granulate, then the resulting mixture was grinded and dried at 25° C. for 6 hours (step 9B.).

The product obtained from this procedure was an off-white or grey, solid, small particle sized granulate.

REMARKS

*: since different compounds of SiO$_x$(OH)$_n$ (heteropoly acids) can precipitate from liquid glass solution on standing, for pilot plant or industrial scale use, it is advisable to measure the sodium silicate solution's density and percentage by weight before the measurements. This can be performed by gravimetric titration in which the solution gets titrated with Ca(OH)$_2$ solution, then the concentration and the percentage by weight can be calculated from the weight of the precipitated material obtained. The necessary volume of the liquid glass solution given in ml can be calculated by substituting the data obtained in the formula below:

$$V_{liquid\ glass\ solution} \approx V_{TEOS}/(1,016*10^{-3}*\rho_{liquid\ glass\ solution}* w/w\%_{liquid\ glass\ solution})$$

**: the catalyst marked Al(OH)$_3$:AlCl$_3$=100:1 can be prepared by mixing aluminium hydroxide anhydrous with aluminium chloride, using 100 [g] parts by weight of aluminium hydroxide (Al(OH)$_3$) and 1 [g] of aluminium chloride (AlCl$_3$). The resulting mixture should be stored in anhydrous conditions.

***: using UV light with a specific wavelength—to accelerate the catalysis—is practical only if a small amount of admixture composition was prepared in laboratory, this process is inapplicable in pilot plant or industrial scale.

****: the polystyrene solutions used for the process was always prepared by dissolving loose polystyrene beads originated from milled waste polystyrene in dichloromethane solvent as follows: 50 g of waste polystyrene was dissolved in 500 ml of dichloromethane, while it was stirred continuously, then the obtained solution was filtered to remove the solid impurities which may occur.

The reaction conditions of examples A1-A10 and B1-B5 and the applied molar ratios are summarized in table below:

| | | | | Precursors - Initial materials | | | | | |
|---|---|---|---|---|---|---|---|---|---|
| Examples | TEOS [ml] | 1,2-PG [ml] | PPGP400 [ml] | Foamglass-pearl [g] | N-buthylamine [ml] | pH$_1$ | Liquid-glass solution (40%) [ml] | HCl-solution (18%) [ml] | pH$_2$ |
| A1 | 10 | 20 | 5 | 100 | 5 | 8.4 | 200 | — | 9.2 |
| A2 | 10 | 20 | 5 | 100 | 2.5 | 8.2 | 95 | 16.7 | 7.4 |
| A3 | 10 | 20 | 5 | 100 | 5 | 8.3 | 350 | 61.5 | 7.7 |
| A4 | 10 | 20 | 5 | 100 | 5 | 8.4 | 115 | 20.2 | 7.9 |
| A5 | 10 | 20 | 5 | 100 | 2.5 | 7.8 | 400 | — | 9.4 |
| A6 | 10 | 20 | 5 | 100 | 2.5 | 8.1 | 125 | 22.0 | 7.6 |
| A7 | 10 | 20 | 5 | 100 | 2.5 | 8.0 | 150 | 26.3 | 7.6 |
| A8 | 10 | 20 | 5 | 100 | 2 | 7.8 | 175 | 30.7 | 7.6 |
| A9 | 10 | 20 | 5 | 100 | 2.5 | 8.0 | 200 | 35.1 | 7.5 |
| A10 | 10 | 20 | 5 | 100 | 2 | 7.8 | 400 | — | 9.5 |
| B1 | 10 | 20 | 5 | 100 | 2 | 7.8 | 95 | 16.7 | 7.4 |
| B2 | 10 | 20 | 5 | 100 | 2 | 7.8 | 115 | 20.2 | 7.4 |
| B3 | 10 | 20 | 5 | 100 | 2 | 7.9 | 150 | 26.3 | 7.3 |
| B4 | 10 | 20 | 5 | 100 | 2.5 | 8.1 | 150 | 26.3 | 7.4 |
| B5 | 10 | 20 | 5 | 100 | 2.5 | 8.1 | 200 | 35.1 | 7.4 |

| | | | Precursors - Initial materials | | | | | |
|---|---|---|---|---|---|---|---|---|
| Examples | Component-"A" [ml] | Component-"B" [ml] | Polystyrene-solution [ml] | AlCl$_3$ 100:1 [g] | AlCl$_3$ 10:1 [g] | PVA-dispersion [ml] | DCM [ml] | Destillated water [ml] |
| A1 | 100 | 100 | 20 | — | — | — | 150 | 200 |
| A2 | 100 | 100 | 20 | — | — | — | 150 | 150 |
| A3 | 100 | 100 | 20 | — | — | — | 150 | 200 |
| A4 | 100 | 100 | 50 | — | 12.5 | — | 200 | 150 |
| A5 | 100 | 100 | 50 | — | 10 | — | 200 | 150 |
| A6 | 100 | 100 | 50 | 10 | — | — | 200 | 150 |
| A7 | 50 | 50 | 20 | — | 5 | 10 | 150 | 150 |
| A8 | 50 | 50 | 50 | — | 7.5 | 10 | 200 | 150 |

-continued

| | | | | | | | | |
|---|---|---|---|---|---|---|---|---|
| A9 | 50 | 50 | 50 | — | 7.5 | 15 | 200 | 150 |
| A10 | 50 | 50 | 50 | 30 | — | 20 | 200 | 200 |
| B1 | 50 | 50 | 25 | — | 5 | — | 100 | 100 |
| B2 | 50 | 50 | 25 | — | 15 | 15 | 100 | 100 |
| B3 | 50 | 50 | 25 | — | 20 | 20 | 100 | 100 |
| B4 | 50 | 50 | 25 | — | 20 | 30 | 100 | 100 |
| B5 | 50 | 50 | 25 | — | 20 | 50 | 100 | 100 |

10

| Reaction conditions and the main parameters | | | | | | | | | | | | | |
|---|---|---|---|---|---|---|---|---|---|---|---|---|---|
| Example | N-Butyl-amine [ml] | $pH_1$ | Applied temperature [°C.] | Liquid glass solution (40%) [ml] | UV Irradiation time [second] | HCl solution (18%) [ml] | $pH_2$ | $n_{1,2\text{-}PG}/n_{TBOS}$ | $n_{1,2\text{-}PG}/n_{n\text{-}BA}$ | $n_{Na2SiO3}/n_{n\text{-}BA}$ | $n_{Na2SiO3}/n_{PS}$ | $n_{Na2SiO3}/n_{1,2\text{-}PG}$ | Applied unit operation |
| A1 | 5 | 8.4 | 55 | 200 | 120 | — | 9.2 | 6.1 | 5.4 | 10.0 | 23.2 | 1.9 | dilution/homogenization |
| A2 | 2.5 | 8.2 | 55 | 95 | 120 | 16.7 | 7.4 | 6.1 | 10.8 | 9.5 | 11.0 | 0.9 | dilution/homogenization |
| A3 | 5 | 8.3 | 65 | 350 | 30 | 61.5 | 7.7 | 6.1 | 5.4 | 17.5 | 40.5 | 3.3 | dilution/homogenization |
| A4 | 5 | 8.4 | 55 | 115 | 120 | 20.2 | 7.9 | 6.1 | 5.4 | 5.8 | 5.3 | 1.1 | dilution/homogenization |
| A5 | 2.5 | 7.8 | 65 | 400 | 90 | — | 9.4 | 6.1 | 10.8 | 40.1 | 18.5 | 3.7 | dilution/homogenization |
| A6 | 2.5 | 8.1 | 65 | 125 | 90 | 22 | 7.6 | 6.1 | 10.8 | 12.5 | 5.8 | 1.2 | dilution/homogenization |
| A7 | 2.5 | 8.0 | 75 | 150 | 90 | 26.3 | 7.6 | 6.1 | 10.8 | 15.0 | 17.4 | 1.4 | dilution/homogenization |
| A8 | 2 | 7.8 | 75 | 175 | 120 | 30.7 | 7.6 | 6.1 | 13.5 | 21.9 | 8.1 | 1.6 | dilution/homogenization |
| A9 | 2.5 | 8.0 | 75 | 200 | 120 | 35.1 | 7.5 | 6.1 | 10.8 | 20.0 | 9.3 | 1.9 | dilution/homogenization |
| A10 | 2 | 7.8 | 75 | 400 | 120 | — | 9.5 | 6.1 | 13.5 | 50.1 | 18.5 | 3.7 | dilution/homogenization |
| B1 | 2 | 7.8 | 65 | 95 | 90 | 16.7 | 7.4 | 6.1 | 13.5 | 11.9 | 8.8 | 0.9 | concentration/drying |
| B2 | 2 | 7.8 | 55 | 115 | 90 | 20.2 | 7.4 | 6.1 | 13.5 | 14.4 | 10.7 | 1.1 | concentration/drying |
| B3 | 2 | 7.9 | 55 | 150 | 90 | 26.3 | 7.3 | 6.1 | 13.5 | 18.8 | 13.9 | 1.4 | concentration/drying |
| B4 | 2.5 | 8.1 | 55 | 150 | 90 | 26.3 | 7.4 | 6.1 | 10.8 | 15.0 | 13.9 | 1.4 | concentration/drying |
| B5 | 2.5 | 8.1 | 55 | 200 | 90 | 35.1 | 7.4 | 6.1 | 10.8 | 20.0 | 18.5 | 1.9 | concentration/drying |

The admixture composition may consist of the following:

Based on an ideal scenario with optimal efficiency in a non-restrictive way, since differences may obviously occur in practice, the final compound of the admixture composition is as follows:

glycol-copolymer type compounds: 15-10 w/w % glycol polymer silica type compound: 45-50 w/w % polyurethane synthetic resin: 13-22 w/w % polystyrene: 2-3 w/w %, organic solvents: 15-25 w/w % water (as a solvent and dispersion medium) 15-25 w/w %, or solid admixtures.

With respect to the ranges of composition given above, it is important to note that the viscous, paste-like admixture compositions obtained by the processes described in the examples, given that they were developed for industrial use, after applying further chemical processes (dilution and homogenization, and drying and grinding), we wanted to use them in two states of matter.

In terms of its physical characteristics, the admixture composition according to the invention is an off-white liquid with a characteristic odor, of greater density than water, or off-white—pale yellow porous solid granules.

The principle of the use of the admixture composition according to the invention can be summarized as follows:

The admixture composition is, dispersed in synthetic resin or synthetic resin mixture as a dispersion medium, a complex colloidal system, formed in the reaction of an organic polystyrene solution or a polystyrene/polymer mixture, an organic silane ester compound, a glycol compound, a polyglycol compound and an inorganic silicate compound—on the surface of an agent with surface charge—using a catalyst. While applying the composition, during mixing lightweight concrete containing polystyrene beads, the colloidal suspension decomposes when the mixing water is added, the synthetic resin component coats the surface of the polystyrene beads, and at the same time the reactive polymer silica agents are incorporated into the surface of the beads. As a result, the polystyrene beads of different sizes not only interact with the materials formed during the hydration of the cementitious constituents through physisorption processes, but also react directly with the silicate gel system as the chemisorption process takes place. In parallel, polystyrene particles surface-modified with polymer-silica groups are released from the system, thus allowing the surface-modified polystyrene particles to be incorporated into the silicate structure which is forming, while these surface-modified polystyrene particles also have a space-filling role. This process can be considered as own material doping because, in addition to the 3-5 mm and 1-2 mm polystyrene beads used as admixtures in the process, polystyrene particles with an extremely small particle size—0.2-0.75 mm in diameter on average—are also formed. The foam glass bead used, which acted as a support material and catalyst during the preparation of the admixture composition, catalyzes this process due to its high specific surface and surface charge, while itself is incorporated into the cement truss. During the application of the admixture composition, not only the surface of the polystyrene beads of expediently controlled size (3-5 mm and 1-2 mm) used is modified chemically, but also the surface of other fibrous plastic chips is coated with the synthetic resin-polymer-silica complex compound, so these plastic chips are also able to change the characteristics of the finished lightweight concrete to an even greater extent.

The reactive polymer silica groups embedded in the surface of the formed polystyrene particles and the polystyrene beads react with the silicate gel system formed during the hydration of the cement, so that these materials have not only the role of space filling and/or backfill (and fiber reinforcement optionally) in lightweight concrete, but essentially become structural components of the cement stone truss. The incorporation of reactive polymer-silica groups into the surface of polystyrene beads and the formation of reactive polystyrene particles have a direct effect on the concrete technology properties of concretes; they increase the compressive and flexural strength of lightweight concretes, affect the water impermeability and fire resistance of concretes.

Since the self-aggregation density and chemical properties of the polystyrene beads also change during the reaction, by using the admixture composition the possibility of undesired demixing of the concretes can be reduced, the homogeneity and workability of the concretes improve, and at the same time the shrinkage in the finished product is reduced.

The process of hardening of concretes, although described in many ways, is basically determined by the hydration of calcium silicate-calcium aluminium silicate compounds. During the addition of the mixing water, there is no preferred order in the hydration of the cementitious constituents, the gel formation process starts immediately on the surface of the finely ground cement particles. As the specific surface of the cementitious constituents increase, the process of hydration accelerates, and at the same time the probability of the occurrence of possible side reactions also increases. Other components in different types of cement and the light admixtures used in the manufacture of concretes can significantly influence these hydration processes, in many cases they have a very large effect on the concrete chemistry properties of the finished products. One of the most significant effects of the use of the admixture composition and other solid phase admixtures (hydraulic binders class II: metakaolin, coal fly ash) is to reduce the number of undesired, potentially harmful chemical reactions in concrete, the likelihood of their occurrence and the adverse effects caused by their occurrence.

The admixtures affect the pH of the system, so the alkaline reactions having a particularly harmful effect (e.g. the formation of alkali chlorides) are getting confined, the skeleton of the calcium silicate hydrate(s) formed becomes more structured and homogeneous, the number of the secondary structure organising reactions (ferrite; and aluminosilicate) occurring during hydration is reduced significantly. The calcium hydroxide formed during the formation of calcium silicate hydrates is activated during complexation and, acting as a source of calcium, participates in the formation of new silicate hydrates. The components of the admixture composition modify the calcium and silicon content (Ca/Si ratio) of the silicate gel system, so the relative proportions of the calcium silicate hydrates ($C_2S$ and $C_3S$) formed can be influenced favorably.

A further advantage of using the admixture composition according to the invention is that it is possible to make lightweight concretes with a high polystyrene bead content reinforceable. The condition for the use of steel reinforcement used in different types of concrete is the cooperation of the concrete components and the surface of the reinforcement bar. This co-operation (adhesion) is practically the sum of the actions between the surfaces of the reinforcement and the concrete parts. It is a generally accepted principle of construction that steel reinforcement can only be used for saturated concretes and that the type of admixture(s) is a key determinant of the applicability of steel reinforcement. The active ingredient of the admixture composition synthetic resin-polymer silica described above enters into surface chemistry reaction with the iron reinforcement during use and greatly increases the adhesion interaction between the concrete parts and the surface of the steel reinforcement. The surface of the steel reinforcement is coated with a very thin layer of synthetic resin-polymer silica, and the components of the calcium silicate hydrate system are incorporated into this layer by physical interaction and chemical reaction.

Another advantage of surface coating of the reinforcement is that spaces are less likely to occur in the concrete where the surface of the reinforcement does not meet the concrete components or the admixture used, thus significantly reducing the susceptibility of the steel reinforcement to corrosion. A further advantage is that the shrinkage of the calcium silicate hydrate system has only a small effect on the adhesion interaction between the surface of the reinforcement and the concrete components.

In some cases, it is not necessary to change the concrete chemistry properties of polystyrene lightweight concretes to a large extent, because this is not required for the specific application. In such cases, it is possible to use only the liquid admixture composition according to the invention in the manufacture of concrete products, most preferably in cases where with low or medium cement content (200-350 kg; 350-600 kg) and body density (250-650 kg/m$^3$; 650-1600 kg/m$^3$) a large amount of polystyrene beads (30-60%) is used.

Production Technology of Polystyrene Lightweight Concretes Prepared Using the Admixture Composition According to the Invention The effectiveness of the admixture composition according to the invention or the combined use of the admixture composition and other excipients can only be illustrated by comparing them with a given reference. Therefore, in addition to the ICL lightweight concretes containing 800 kg of portland cement, made by us, we also present a production technology process for the production of so-called reference lightweight concretes containing 800 kg of cement, which makes it possible to compare the compositions and concrete technology characteristics of lightweight concretes made by using only admixture composition (ICL400A; ICL600A and ICL800A), made by the combined use of admixture composition and excipients (ICL400AS; ICL600AS and ICL800AS), and those containing no admixtures or excipients (REF400; REF600 and REF800). In order to demonstrate the effectiveness of the admixture composition according to the invention, the concrete mixtures prepared by us are also compared with the concrete mixtures according to the examples citing prior art, given partly in the patents. Production technology processes and recipes are given for mixtures containing 800 kg of portland cement and 450 l of PS beads, but in the table there are given the composition and characteristics of concretes produced by using the 400 kg of portland cement and 1000 l of PS beads, and 600 kg of portland cement and 700 l of PS beads.

The embodiments for producing polystyrene concrete according to the present invention using the admixture composition—produced by process A1 (hereinafter referred to as the admixture composition A1) and the hydraulic binder Class I (hereinafter referred to as CEMII/A-S type 42.5N portland cement), concrete plant sand with a size distribution of 0-4 mm (hereinafter: 0-4 OH), mixing water, polystyrene beads with a mixed size distribution—generally 1-2 mm and 3-5 mm, respectively—(hereinafter: PS-beady), Mapei X-Tend W200r Type superplastizer (hereinafter: superplastizer), hydraulic binder Class II (hereinafter: silica powder) and admixtures (hereinafter: metakaolin, coal fly ash and calcined limestone flour) are given a follows:

Embodiment A0.0 (Comparative Example): for a concrete mixture marked REF800 prepared using 800 kg of portland cement and 450 l of PS pearls with a mixed size distribution, NOT containing the admixture composition according to the invention and other excipients, without limiting the solution to the example only.

225 l of 3-5 mm and 225 l of 1-2 mm particle size polystyrene beads are weighed into the mixer (step 1)

577 kg (at 0% moisture content) of 0-4 OH is weighed into the mixer (step 2)

800 kg of CEMII/A-S 42.5N type cement is admixed to the system during continuous stirring (step 3)

305 kg of mixing water is weighed into the mixer (step 4)

Weighing 1.2 kg of superplastizing admixture into the mixer (step 5)

Stirring the concrete mix for a minimum of 5 minutes (step 6)

From the finished concrete mixture 3 standard test cubes of 150*150*150 mm are made (step 7)

Embodiment A1.1: for a concrete mixture marked ICL800A, using 800 kg of portland cement and 450 l of PS beads with a mixed size distribution, APPLYING the admixture composition according to the invention but NOT containing other excipients, without limiting the solution to the example only.

225 l of 3-5 mm and 225 l of 1-2 mm particle size polystyrene beads are weighed into the mixer (step 1)

38 kg of liquid admixture composition prepared by the process A1 is weighed into the mixer (step 2)

590 kg (at 0% moisture content) of 0-4 OH is weighed into the mixer (step 3)

800 kg of CEMII/A-S 42.5N type cement is admixed to the system during continuous stirring (step 4)

270 kg of mixing water is weighed into the mixer (step 5)

Weighing 2.4 kg of superplastizing admixture into the mixer (step 6)

Stirring the concrete mix for a minimum of 5 minutes (step 7)

From the finished concrete mixture 3 standard test cubes of 150*150*150 mm are made (step 8)

Embodiment A1.2: for a concrete mixture marked ICL800AS prepared using 800 kg of portland cement and 450 l of PS pearls with a mixed size distribution, containing the admixture composition according to the invention and other excipients ALIKE, without limiting the solution according to the invention to the example only.

225 l of 3-5 mm and 225 l of 1-2 mm particle size polystyrene beads are weighed into the mixer (step 1)

28 kg of the liquid admixture composition prepared by the process A1 is weighed into the mixer (step 2)

100 kg (at 0% moisture content) of 0-4 OH is weighed into the mixer (step 3)

60 kg of metakaolin, 60 kg of coal fly ash and 60 kg of calcined limestone flour (180 kg of other excipients altogether) are weighed into the mixer (step 4)

88 kg of silica powder is weighed into the mixer (step 5)

800 kg of CEMII/A-S 42.5N type cement is admixed to the system during continuous stirring (step 6)

337 kg of mixing water is weighed into the mixer (step 7)

Weighing 2.4 kg of superplastizing admixture into the mixer (step 8)

Stirring the concrete mix for a minimum of 5 minutes (step 9)

From the finished concrete mixture 3 standard test cubes of 150*150*150 mm are made (step 10)

Embodiment A1.3: for a concrete mixture marked ICL800ASPP prepared using 800 kg of portland cement and 450 l of PS pearls with a mixed size distribution, containing the admixture composition according to the invention, other excipients, and plastic fiber chips ALIKE, without limiting the solution according to the invention to the example only.

225 l of 3-5 mm and 225 l of 1-2 mm particle size polystyrene beads are weighed into the mixer (step 1)

28 kg of the liquid admixture composition prepared by the process A1 is weighed into the mixer (step 2)

1.7 kg of polypropylene (PP) synthetic fiber—of 5-7 cm length on average—is weighed into the mixer (step 3)

100 kg (at 0% moisture content) of 0-4 OH is weighed into the mixer (step 4)

60 kg of metakaolin, 60 kg of coal fly ash and 60 kg of calcined limestone flour (180 kg of other excipients altogether) are weighed into the mixer (step 5)

88 kg of silica powder is weighed into the mixer (step 6)

800 kg of CEMII/A-S 42.5N type cement is admixed to the system during continuous stirring (step 7)

337 kg of mixing water is weighed into the mixer (step 8)

Weighing 2.4 kg of superplastizing admixture into the mixer (step 9)

Stirring the concrete mix for a minimum of 5 minutes (step 10)

From the finished concrete mixture 3 standard test cubes of 150*150*150 mm are made (step 11)

The compositions per admixtures of the recipes according to the embodiments A0.0, A1.1 and A1.2 and the concrete technology characteristics of the standard test specimen are given in table form below:

| m/m % (v/v %) | REF400 | ICL400A | ICLA00AS | REF600 | ICL600A |
|---|---|---|---|---|---|
| Concrete components | | | | | |
| Cement | 41.97 (8.92) | 40.83 (8.83) | 44.02 (8.85) | 44.12 (14.69) | 43.20 (14.50) |
| PS-beads* | 2.85 (68.87) | 2.78 (68.17) | 2.99 (68.38) | 1.40 (52.99) | 1.37 (52.28) |
| 0-4 OH | 34.63 (8.74) | 33.69 (8.65) | 11.01 (2.63) | 37.50 (14.85) | 36.72 (14.65) |
| Superplastizer | 0.08 (0.039) | 0.24 (0.12) | 0.26 (0.12) | 0.07 (0.049) | 0.13 (0.095) |
| A1-Admixture | — | 3.88 (1.96) | 3.08 (1.45) | — | 2.74 (2.03) |
| Mixing water** | 20.46 (13.43) | 18.58 (12.27) | 23.88 (14.83) | 16.91 (17.41) | 15.84 (16.43) |
| Metakaolin | — | — | 3.30 (0.82) | — | — |
| Coal fly ash | — | — | 3.30 (0.83) | — | — |
| Calcined limestone flour | — | — | 3.30 (0.82) | — | — |
| Silica powder | — | — | 4.84 (1.25) | — | — |

| m/m % (v/v %) | ICL600AS | REF800A0.0 | ICL800AA1.1 | ICL800ASA1.2 |
|---|---|---|---|---|
| Concrete components | | | | |
| Cement | 48.29 (14.62) | 47.10 (20.92) | 46.71 (20.96) | 51.69 (21.31) |
| PS-beads* | 1.53 (52.72) | 0.72 (36.35) | 0.71 (36.44) | 0.79 (37.05) |
| 0-4 OH | 8.05 (2.89) | 34.15 (18.02) | 34.45 (18.38) | 6.46 (3.17) |
| Superplastizer | 0.19 (0.128) | 0.07 (0.069) | 0.14 (0.138) | 0.16 (0.140) |
| A1-Admixture | 2.25 (1.51) | — | 2.22 (2.19) | 1.81 (1.64) |
| Mixing water** | 23.50 (21.99) | 17.96 (24.64) | 15.77 (21.86) | 21.78 (27.74) |
| Metakaolin | 3.62 (1.35) | — | — | 3.88 (1.98) |
| Coal fly ash | 3.62 (1.35) | — | — | 3.88 (1.98) |
| Calcined limestone flour | 3.62 (1.35) | — | — | 3.88 (1.98) |
| Silica powder | 5.31 (2.07) | — | — | 5.69 (3.02) |

| For mixing a volume of 1 m³ | REF400 | ICL400A | ICLA00AS | REF600 | ICL600A |
|---|---|---|---|---|---|
| Concrete components | | | | | |
| Cement [kg] | 400 | 400 | 400 | 600 | 600 |
| PS-beads* [l] | 1000 | 1000 | 1000 | 700 | 700 |
| 0-4 OH [kg] | 330 | 330 | 100 | 510 | 510 |
| Superplastizer [kg] | 0.8 | 2.4 | 2.4 | 0.9 | 1.8 |
| A1-Admixture [kg] | — | 38 | 28 | — | 38 |
| Mixing water** [kg] | 195 | 180 | 217 | 230 | 220 |
| Metakaolin [kg] | — | — | 30 | — | — |
| Coal fly ash [kg] | — | — | 30 | — | — |
| Calcined limestone flour [kg] | — | — | 30 | — | — |
| Silica powder [kg] | — | — | 44 | — | — |
| Concrete technology characteristics (28 days) | | | | | |
| Body density [kg/m³] | 874 | 826 | 753 | 1285 | 1254 |
| Compressive strength [MPa] | 2.8 | 4.9 | 6.2 | 6.5 | 11.8 |
| Flexural strength [MPa] | 0.9 | 1.7 | 2.1 | 1.2 | 2.2 |
| water/cement ratio | 0.38 | 0.45 | 0.49 | 0.38 | 0.37 |

-continued

| For mixing a volume of 1 m³ | | ICL600AS | REF800A0.0 | ICL800AA1.1 | ICL800ASA1.2 |
|---|---|---|---|---|---|
| Concrete components | Cement [kg] | 600 | 800 | 800 | 800 |
| | PS-beads* [l] | 700 | 450 | 450 | 450 |
| | 0-4 OH [kg] | 100 | 580 | 590 | 100 |
| | Superplastizer [kg] | 2.4 | 1.2 | 2.4 | 2.4 |
| | A1-Admixture [kg] | 28 | — | 38 | 28 |
| | Mixing water** [kg] | 292 | 305 | 270 | 337 |
| | Metakaolin [kg] | 45 | — | — | 60 |
| | Coal fly ash [kg] | 45 | — | — | 60 |
| | Calcined lime-stone flour [kg] | 45 | — | — | 60 |
| | Silica powder [kg] | 66 | — | — | 88 |
| Concrete technology characteristics (28 days) | Body density [kg/m³] | 1116 | 1594 | 1586 | 1415 |
| | Compressive strength [MPa] | 13.5 | 13.9 | 16.8 | 24.5 |
| | Flexural strength [MPa] | 2.4 | 1.5 | 2.2 | 3.2 |
| | water/cement ratio | 0.4 | 0.38 | 0.34 | 0.38 |

Notes:

*The density pf PS-beads$_{3-5}$ (3-5 mm size distribution) and PS-beads$_{1-2}$ (1-2 mm size distibution) may differ slightly depending on the manufacturer and particle size distribution. The body density of the PS-beads$_{3-5}$ (3-5 mm size distribution) is in the range of approx. 15-20 kg/m² (in our case calculated by 16.4 kg/m³ declared by the manufacturer), the body density of PS-beads$_{1-2}$ (1-2 mm size distribution) is in the range of approx. 30-40 kg/m³ (in our case calculated by 38 kg/m³), based on our experience.

**Since during the specified production processes the liquid admixture composition according to the process A1 is used, which composition also has a given water content, the amount of mixing water to be weighted in must be calculated according to the following correlation: mixing water, corrected = mixing water, calculated − 0.3 * admixture composition = mixing water, calculated − 0.372 * Vadmixture composition On the basis of the results obtained, the beneficial effect of the use of the admixture composition and the combined use of the additive composition and the excipients is clear. In the following, the results of our 2 mixtures, ICL600A and ICL600AS, are compared with some of the results of the patents cited partly according to prior art. The basis of the comparison is the almost identical cement content.

examples mentioned a better quality hydraulic binder was used than the cement used by us.

The solution according to the invention makes it possible to produce lightweight concretes with a higher content of polystyrene beads than before, the physical parameters of

| | | Example 4 Sample D | Example 13 Ex. CC | ICL600A | ICL600AS |
|---|---|---|---|---|---|
| Concrete components | Cement [kg] | 672 (CEM III) | 500 (CEM III) | 600 (CEM II) | 600 (CEM II) |
| | PS-beads$_v^1$ [l] | 370 | 391 | 700 | 700 |
| | 0-4 OH [kg] | 520 | 714 | 510 | 590 |
| | Mixing water² [kg] | 235 | 199.6 | 220 | 292 |
| | Superplastizer [kg] | n.a. | n.a. | 1.8 | 2.4 |
| | A1-Admixture composition [kg] | — | — | 38 | 28 |
| | Auxiliary materials [kg] | — | — | — | 201 |
| Concrete technology characteristics days) | Body density [kg/m³] | 1435.4 | 1425.8 | 1254 | 1116 |
| | Compressive strength [MPa] | 8.6 | 11.8 | 11.8 | 13.5 |
| | water/cement ratio | 0.35 | 0.4 | 0.37 | 0.44 |

It can be clearly seen from the data in the table that the use of the admixture composition according to the invention greatly improves the concrete technology characteristics of lightweight concretes. Compared our lightweight concrete (ICL600AS) prepared using 600 kg cement and 700 l PS-beads, and admixture composition and auxiliary materials to the lightweight concrete with the composition given in Example 4 on page 13 in the description of disclosed Patent No. US20070062415A1, it can be stated that using nearly 10% less cement and nearly 90% more PS beads, products with significantly lower bulk density and higher compressive strength can be made. In the case of the lightweight concrete with the composition given in Example 13 on page 32 of the disclosed U.S. Pat. No. 7,632,348B2, it can also be said that by using almost 80% more PS beads, significantly higher compressive strength can be achieved even at significantly lower bulk density, even if in the 2 which can be changed according to user requirements, and it also offers an environmentally friendly way of recycling waste.

The invention claimed is:

1. An admixture composition comprising:
dissolved polystyrene beads, and
a mixture of organic and inorganic materials, wherein said mixture of organic and inorganic consists of a liquid reaction product or a solid composition prepared from the reaction of the following components:
at least one glycol copolymer compound, wherein said at least one glycol copolymer compound is obtained by a base-catalyzed polymerization reaction of alkyl glycol compounds, in an amount of 15-10 w/w %,
at least one glycol polymer-silica compound, wherein said at least one glycol polymer-silica compound is obtained by a base-catalyzed reaction of alkyl glycol and organic and inorganic silicon compounds respectively, in an amount of 45-50 w/w %, a two-component polyurethane-based synthetic resin, wherein component A is polyol and component B is isocyanate, in an amount of 13-22 w/w %, in an organic medium which is prepared from a polymerized aromatic monomer compound containing polystyrene obtained from polymerization of styrene monomer or a polymerized unsaturated double bond containing aromatic polymer dissolved in an organic solvent, in an amount of 2-3 w/w %, and foam glass beads in an amount of 25-15 w/w %;

wherein said liquid reaction product comprises organic solvents in an amount of 15-20 w/w %, and water in an amount of 10-5 w/w %, based on the total weight of the above composition; and wherein said solid composition comprises polyvinyl alcohol in an amount of 10-5 w/w %, aluminum hydroxide in an amount of 2-5 w/w %, and calcined limestone flour in an amount of 8-10 w/w %, based on the total weight of the above composition.

\* \* \* \* \*